H. MAYER.
PLATE SPRING FOR VEHICLES.
APPLICATION FILED JAN. 8, 1914.
1,115,708.
Patented Nov. 3, 1914.
2 SHEETS—SHEET 1.
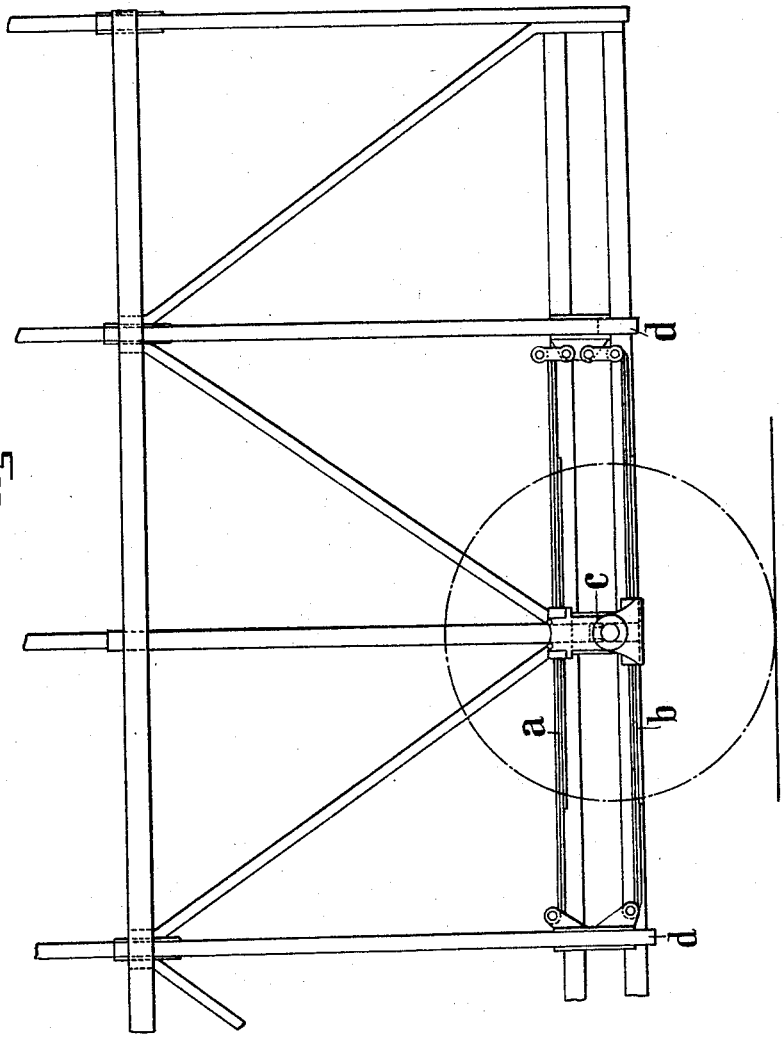
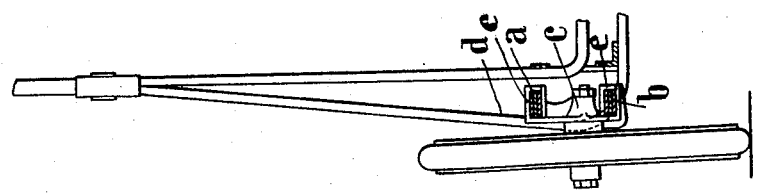
Witnesses:
E. Leckert
M. J. L. Higgins.
Inventor
Heinrich Mayer.
By Henry Orth, Atty.

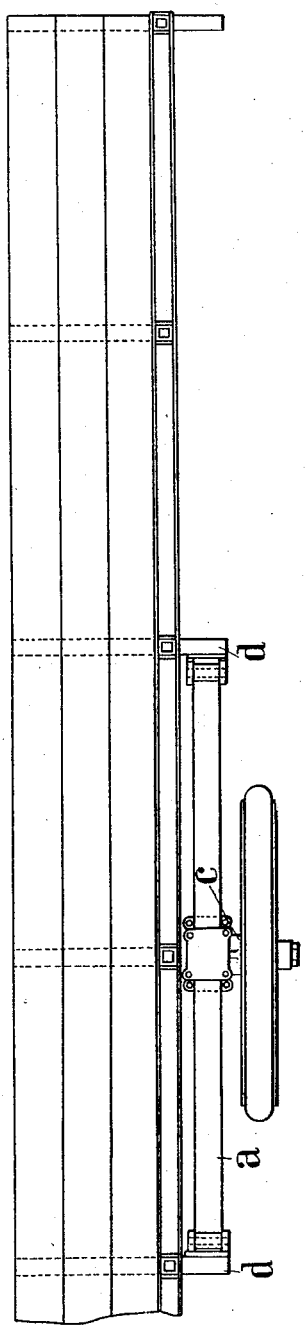

UNITED STATES PATENT OFFICE.

HEINRICH MAYER, OF ARBON, SWITZERLAND.

PLATE-SPRING FOR VEHICLES.

1,115,708.  Specification of Letters Patent.  Patented Nov. 3, 1914.

Application filed January 8, 1914. Serial No. 811,027.

*To all whom it may concern:*

Be it known that I, HEINRICH MAYER, a citizen of the German Empire, and residing at Arbon, Switzerland, have invented certain new and useful Improvements in Plate-Springs for Vehicles, of which the following is a specification.

A primary object of this invention is to obviate a defect which has been attached to plate, laminated or leaf springs of all kinds employed heretofore for the suspension of the bodies of vehicles. This defect is that when the springs are flexed, the stiffness thereof increases toward the end of such flexion. If the one spring of a pair of car-springs resting on an axle is flexed more than the other, owing to the shortening of the distance between the two springs which are located opposite one another that spring which is flexed most is twisted in addition, so that the same must bend inward and consequently the above mentioned stiffness increases, quite aside from the considerable additional injurious stresses produced thereby. The problem arising in consequence of this defect can be solved in various ways. According to this inveneion the plate, laminated or leaf springs in question are guided in such manner that it is impossible for them to twist.

To these ends, the invention consists in the construction, arrangement and combination of parts described hereinafter and pointed out in the claim.

In the accompanying drawings, Figures 1, 2 and 3 are side elevation, end elevation and top plan view, respectively Two plate, laminated or leaf springs *a*, *b* arranged vertically one above the other are connected, on the one hand, to the axle support or steering swivel *c* and, on the other hand, to the frame *d* of the vehicle in a suitable manner but so, however, that a continuous axle which connects the two wheels together can be dispensed with; it is advisable that such an axle be dispensed with in order with certainty to avoid the above-mentioned shortening of the distance between the springs and the defects connected therewith. In this arrangement it is only essential that the central bearings *e* of the two springs be rigidly connected together which, in this illustrative embodiment, is effected by casting them in one piece with the axle support or steering swivel. The omission of the through axle has, in addition, other technical advantages which become apparent particularly in motor-cars for the transport of aeroplanes. For example, it is an advantage that the platform or bottom of the vehicle can be located lower down so that its distance from the ground is reduced. The loading of aeroplanes on cars is materially facilitated in this manner. Further, by simply removing the shackle bolts the wheels can be lifted about the opposite point of suspension as a fulcrum, or the platform can be lowered on to the ground, whereby a similar advantage is obtained. Likewise, when traveling in the country the advantage of this arrangement becomes apparent inasmuch as the same affords the possibility of being able to pass under low railway bridges and the like, whereas the top of a taller vehicle might abut against the same.

I claim:—

In a vehicle, the combination with the frame, of two parallel, laminated or plate springs connected at their ends to the frame, a stub-axle support mounted centrally of the springs and having bearings for the latter rigidly connected to said support above and below the axes of the vehicle wheels, whereby lateral displacement of the springs is prevented.

In testimony whereof, I affix my signature in the presence of two witnesses.

HEINRICH MAYER.

Witnesses:
RANDALL ATKINSON,
ARTHUR G. JOSEPH.